United States Patent [19]

Distin, Jr. et al.

[11] Patent Number: 4,553,451

[45] Date of Patent: Nov. 19, 1985

[54] PIN CONTROLLED RETAINER FOR EPICYCLIC TRANSMISSION

[75] Inventors: Robert G. Distin, Jr., Thomas J. Lang, both of Louisville, Colo.

[73] Assignee: Advanced Energy Concepts '81 Ltd., Boulder, Colo.

[21] Appl. No.: 578,931

[22] Filed: Feb. 10, 1984

[51] Int. Cl.⁴ ............................................. F16H 1/28
[52] U.S. Cl. ......................................... 74/805; 74/804
[58] Field of Search ................. 74/804, 805, 801, 797, 74/63, 202, 465

[56] References Cited

U.S. PATENT DOCUMENTS

| | | | |
|---|---|---|---|
| 1,767,866 | 6/1930 | Wildhaber | 74/804 |
| 1,831,577 | 11/1931 | Richer | 74/804 |
| 1,867,492 | 7/1932 | Braren | 74/804 |
| 4,023,440 | 5/1977 | Kennington et al. | 74/804 |

FOREIGN PATENT DOCUMENTS

| | | | |
|---|---|---|---|
| 1750279 | 3/1971 | Fed. Rep. of Germany | 74/804 |
| 991088 | 1/1983 | U.S.S.R. | 74/804 |

*Primary Examiner*—Leslie A. Braun
*Assistant Examiner*—Dwight G. Diehl
*Attorney, Agent, or Firm*—Sughrue, Mion, Zinn, Macpeak, and Seas

[57] ABSTRACT

An epicyclic speed reducing transmission having cylindrical rollers for transmitting torque between first and second confronting surface regions includes a retainer for radially and axially positioning the rollers relative to the first and second confronting surface regions. The retainer includes first and second rings which contain lobes thereon having holes therein which accommodate a series of roller pins. Each of the roller pins has an enlarged roller body portion which rotatably supports the rollers.

12 Claims, 6 Drawing Figures

PIN CONTROLLED RETAINER FOR EPICYCLIC TRANSMISSION

CROSS-REFERENCES TO RELATED APPLICATIONS

The present application is related to U.S. application Ser. Nos. 313,442 and 362,195, one of the present inventors being one of the co-inventors of each of these related applications. The disclosure of each of these related applications is hereby incorporated by reference.

BACKGROUND OF THE INVENTION

The present invention relates to a retainer for maintaining cylindircal rollers in proper spaced relationship between an epitrochoidal-like shaped and a hypotrochoidal-like shaped conjugate set of races in an epicyclic speed reducing transmission of the kind described in the above-mentioned 362,195 application.

Good positional control of rollers held between epitrochoidal-like shaped and hypotrochoidal-like shaped races in an epicyclic speed reducing transmission is essential to obtain optimum performance. Accordingly, it is essential that the axial and radial positioning of the rollers be accurately controlled by a retainer as the epicyclic speed reducing transmission is operated. In addition, the structure of the retainer should not limit the design of the races so that the races can be designed to achieve optimum performance of the transmission.

It is also desirable that the retainer used for maintaining proper positional control of the cylindrical rollers be constructed to allow confronting lobes on the epitrochoidal-like shaped and the hypotrochoidal-like shaped races to nearly touch at the point of closest approach. Such a lobe design of the races allows the cylindrical rollers to transfer maximum possible torque between the races. In addition, the retainer perferably should not contract any substantial part of the driving and driven surfaces of the races.

SUMMARY OF THE INVENTION

Accordingly, an object of the present invention is to provide a retainer for maintaining cylindrical rollers in proper spaced relationship in an epicyclic speed reducing transmission which contains a set of conjugate epitrochoidal-like shaped and hypotrochoidal-like shaped races so that each of the cylindrical rollers is equally spaced from one another.

A further object is to provide a retainer which achieves accurate positional control of the rollers and provides excellent axial positioning of the rollers.

Another object is to provide a retainer which comprises a simple and economical design which can be easily formed.

A still further object of the present invention is to provide a retainer which allows confronting lobes of the conjugate set of races to nearly touch at the point of nearest approach so that maximum possible torque is transferred between the races by the cylindrical rollers.

These and other objects are achieved by a retainer which includes first and second circular rings, with each ring having a series of evenly spaces lobes extending therefrom which each have an aperture or hole therein. The rings are placed on opposite side surfaces of trochoidal-like shaped confronting surface regions such that the holes in the lobes of one of the rings are axially aligned with the holes in the lobes of the other ring. A plurality of rollers for transmitting torque between the confronting surface regions are rotatably retained between the confronting surface regions by a plurality of roller pins which extend through apertures in the rollers, and the roller pins are engaged in the holes of the lobes of the first and second rings and fixedly secured to these lobes. Accordingly, the roller pins structurally interconnect the first and second rings in a secure and strong manner while at the same time providing a simple and economic means for rotatably mounting and controlling the position of the rollers which are used for transmitting torque.

DESCRIPTION OF THE PREFERRED EMBODIMENTS

1. Description of Epicyclic Speed Reducing Transmission

Figure 1:
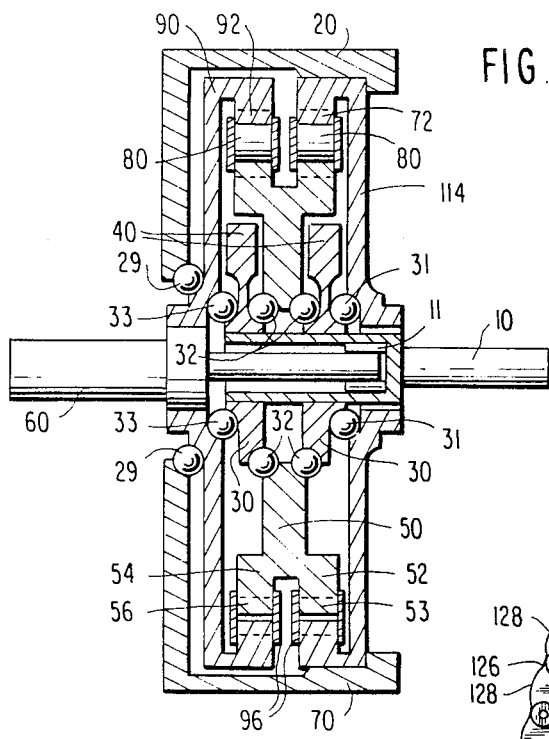
FIG. 1 is a sectional view of a two-stage epicyclic speed reducing transmission utilizing a retainer constructed according to the present invention.
Figure 2:
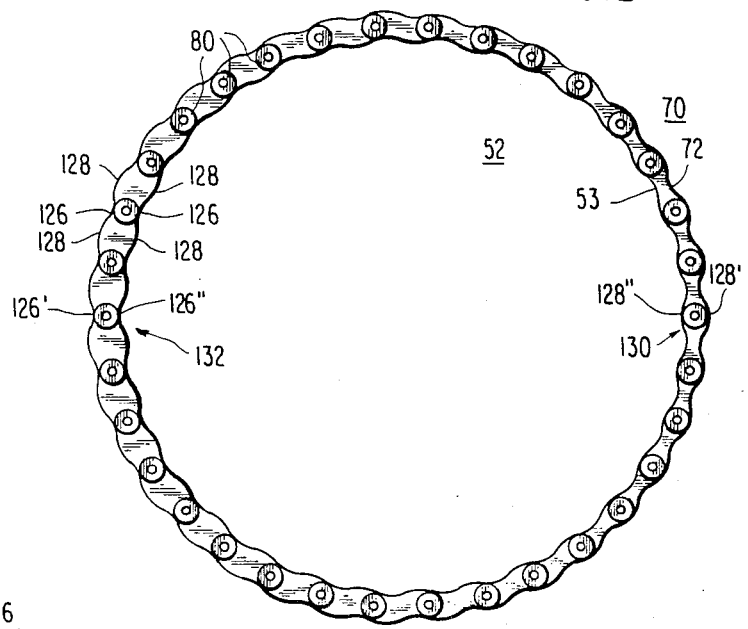
FIG. 2 is a schematic view of opposed hypotrochoidal-like shaped and epitrochoidal-like shaped surfaces utilized in the transmission of FIG. 1, with rollers shown engaged between these surfaces.

FIG. 1 is a sectional view of an epicyclic speed reducing transmission disclosed in copending application Ser. No. 362,195. The epicyclic speed reducing transmission shown in FIG. 1 utilizes first and second conjugate sets of races 72, 53 and 92, 56 for achieving first and second speed reductions, respectively, and each set of conjugate races has a plurality of cylindrical rollers 80 disposed therein for transmitting torque between respective first and second confronting surface regions 72, 53 and 92, 56 of each set of conjugate races. The shape of the first and second confronting surface regions 72, 53 of the first set of conjugate races utilized by the transmission of FIG. 1 is shown in FIG. 2, and a further description thereof is found in the copending application Ser. No. 362,195, cited above. Methods of making these races are described in copending application Ser. Nos. 313,442 and 362,195.

In FIG. 1, first gear means 70 is fixed to a stationary housing 20, and the first gear means 70 functions as a stator in operation. The first surface region 72 of the first gear means 70 is formed with a trochoidal-like curvature, and the first surface region confronts a second surface region 53 which is also formed with a trochoidallike shaped curvature. The second surface region 53 is formed on a first gear element 52 of second gear means 50. The first and second confronting surface regions 72, 53 together comprise the first conjugate set of races.

The second gear means 50 is a journalled on concentric cams 30 formed on an input shaft 10 by means of a ring of bearings 32. The input shaft 10 is received in the housing 20 and is journalled for rotation therein by means of roller bearings 11 which separate the input shaft 10 from an extension of an output shaft 60. The eccentric cams 30 and the input shaft 10 are further supported against the housing 20 by further bearing elements 31 and against an output gear element 90 by bearing elements 33.

As the input shaft 10 is rotated, the second gear means 50 is made to undergo orbital motion by the eccentric cams 30, and a pair of counterweights 40 are provided on the input shaft 10 opposite the most highly eccentric portion of the cams 30 for balancing the transmission as the input shaft 10 is rotated. The orbiting speed of the second gear means 50 is proportional to the rotational speed of the input shaft 10. In addition, due to the presence of the bearings 32, the second gear means 50 is capable of rotating about its axis independently of the orbital motion imparted thereto by the input shaft 10 and the eccentric cams 30. As is evident from the race positions shown in FIG. 2, a top dead center radial position of the cams 30 in FIG. 2 is aligned with arrow 136. As the cams 30 rotate one full rotation, the top dead center position of the cams also rotates one full rotation, as does the point of closest approach 134 between the races 53. 72.

The cylindrical rollers 80 are maintained in spaced relationship between the first and second confronting surface regions 72, 53 of the first set of conjugate races, and the cylindrical rollers 80 transmit torque between the stator race 72 and its conjugate race 53. The second gear means 50 is a generally disc-shaped element which is bifurcated at its radial outer periphery to form the first gear element 52 and a second gear element 54, and, as indicated, the race 53 is formed on the first gear element 52. The second gear element 54 also has an outer surface 56 formed with trochoidal-like shaped curvature which confronts a further trochoidal-like shaped surface 92 formed on the output gear element 90. The surfaces 56, 92 form the second set of conjugate races, and further cylindrical rollers 80 are maintained in spaced relationship by an additional retainer 96 between the surfaces 56, 92 so that the additional rollers 80 transmit torque between the surfaces 56, 92. The output gear element 90 is connected to the output shaft 60, and the bearing elements 29 support the output gear 90 against the housing 20.

As the input shaft 10 is rotated, the eccentric cams 30 cause the second gear means 50 to orbit, and the second gear means 50 is caused to rotate at a first speed reduction due to the roller engagement between the first and second confronting surface regions 72, 53. The output gear element 90 and its associated output shaft 60 are also caused to rotate at a second speed reduction due to the roller engagement between the second set of conjugate races 92, 56.

The first and second sets of conjugate races 72, 53 and 92, 56 are conjugate trochoidal-like shaped, with one of the surface regions of each of the sets being epitrochoidal-like shaped while the other surface region of each of the sets is hypotrochoidal-like shaped. Either of the surface regions of each set of conjugate races can comprise the epitrochoidal-like shaped race with the other surface region of that set comprising the hypotrochoidal-like shaped race.

It should be noted that the first and second surface regions 72, 53, as well as the surface regions of the second set of the conjugate races, are not shaped so as to form true trochoidal curves and, specifically, true epitrochoidal and hypotrochoidal curves, since these surfaces are formed so that the center axis of each of the cylindrical rollers 80 travels a true trochoidal curved path as the rollers 80 transmit torque between the first and second surface regions 72, 53. Since the cylindrical rollers 80 have a finite diameter, the first and second surface regions 72, 53 are necessarily spaced from the center axis of each of the cylindrical rollers and, accordingly, have a shape which necessarily deviates slightly from the true trochoidal path. However, the shapes of the surface regions 72, 53 approach that of a true trochoidal curve and, specifically, a true hypotrochoidal and epitrochoidal curve, respectively, as the radius of the cylindrical rollers 80 approaches zero.

Referring to FIG. 2, the hypotrochoidal-like shaped surface region is shown as being formed on the first surface region 72 and this surface region has two more lobes 126 and two more recesses 128, respectively, than does the epitrochoidal-like shaped surface region 53. The number of rollers 80 disposed between the first and second surface regions 72, 53 corresponds to the number of lobes of the hypotrochoidal-like surface region, less one. The positioning of the respective lobes 126 and recesses 128 of each of the surface regions 72, 53 and the cylindrical rollers 80 range from a first position 130 where one of the rollers 80 is entrained within opposing first 128' and second 128" recesses 128 to a second position 132 where another one of the roller 80 is entrained between first 126' and second 126" confronting lobes 126, with the first and second positions 130, 132 being at diametrically opposite sides of the first gear means 80 and the first gear element 52.

In some embodiments, only half the number of rollers 80 are utilized than the number shown in FIG. 2. Accordingly, when only half as many rollers 80 are utilized, one roller will be located at either the position 130 or 132 while no such roller will be located at the other of these positions, though the surface regions are spaced apart so that one such roller could be located at this other position.

According to the transmission of FIG. 1, as the inner gear member 52 orbits due to the rotational input from the input shaft 10 and the eccentric cams 30, assuming that the outer first gear means 70 is stationary, the inner gear element 52 will be caused to rotate about its axis at a speed determined by the relative number of lobes on the first and second surface regions 72, 53 as the rollers circulate or rollingly engage both these surface regions. Specific formulae for determining the output speed ratio are set forth in the above-mentioned, copending application Ser. No. 362,195.

The second set of conjugate races 92, 56 are shaped like the first set of conjugate races 72, 53 except that the number of lobes and recesses on the second set of races differs from the number of lobes and recesses on the first set of races so that a second, different speed reduction is attained by the roller engagement of the second gear element 54 and the output gear element 90.

2. Description of Retainer for Epicyclic Speed Reducing Transmission

As indicated above, good positional control of the rollers 80 is essential in the epicyclic speed reducing transmission to achieve desired optimum performance, and it is essential that the radial and the axial positions of the rollers be accurately controlled in operation.

Figure 3:
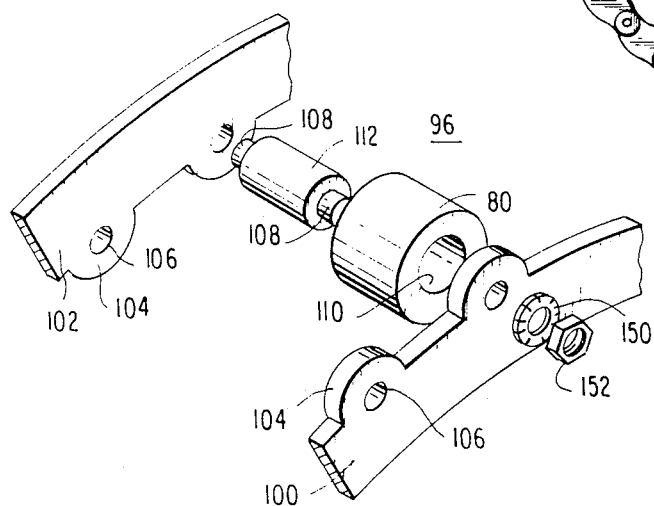
FIG. 3 is an exploded perspective view illustrating one preferred embodiment of a retainer of the present invention.

FIG. 3 illustrates an exploded, perspective view of one embodiment of the retainer 96 for housing the cylindrical rollers 80 and for controlling the radial and axial positions thereof. The retainer 96 includes first and second circular rings 100, 102, with each ring having a series of evenly spaced-apart lobes 104 having apertures or holes 106 therein. The rings are shaped and arranged such that all of the holes 106 of the first ring 100 are opposite and axially aligned with corresponding ones of the holes 106 of the second ring 102 so that roller pins 108 can be retained between respective sets of the lobes 104 on the first and second rings, respectively. The pins can be secured to the lobes by deforming the ends of the pins after they have been inserted into the holes or by threading the ends of the pins so that they can accommodate nuts 150 and lock washers 152. The former method has the advantage of being relatively inexpensive, whereas the latter method has the advantage of providing a means for easily disassembling the retainer. In either case, the plurality of pins provide structural strength to the retainer since they fixedly interconnect the first and second rings 100, 102. The pins 108 extend through holes 110 in each of the rollers 80 used to transmit torque between the first and second confronting surface regions, with the rollers 80 being rotatably supported by an enlarged pin body portion 112.

In the embodiment of FIG. 3, the lobes 104 of the first ring 100 extend radially outward from this ring whereas the lobes 104 of the second ring 102 extend radially inward from this ring. Accordingly, the outside diameter of the second ring 102 is larger than the outside diameter of the first ring 100 since the location of the lobes 106 on each of these rings are required to be axially aligned.

Preferably, the retainer 96 is arranged in the transmission of FIG. 1 so that the larger diameter ring 102 confronts an inner side surface of the hypotrochoidal-like shaped surface region 72 (left side surface of race 72 in FIG. 1A) while the smaller diameter ring 100 confronts an outer side surface of the epitrochoidal-like shaped surface region 53 (right side surface of race 53 in FIG. 1A), and the plurality of rollers 80 are rotatably supported between the rings 100, 102 and between the races 53, 72 via the support provided by the pins 108 secured within the ring holes 106.

Figure 1A:
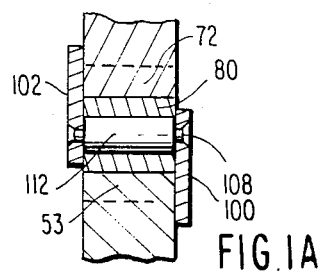
FIG. 1A is an enlarged view of a portion of the transmission shown in FIG. 1.
Figure 4:
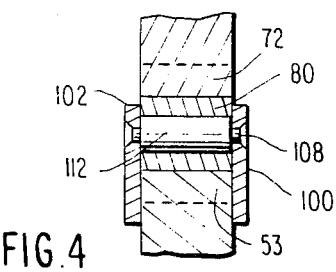
FIGS. 4 and 5 are cross-sectional views of further embodiments of the retainer of the present invention.
Figure 5:
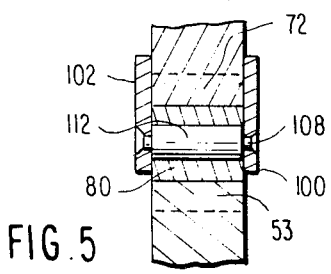

Referring to the transmission of FIG. 1, and in particular to the space between the side surface of a support plate 114 of the first gear means 70 and a side surface of the first gear member 52 of the first gear means 50, it is evident that there is relatively little free space between the elements 52, 114 radially outwardly from the hypotrochoidal-like surface region 72 whereas there is a greater amount of free space between the elements 52, 114 radially inward from the epitrochoidal-like surface region 53. Accordingly, it is advantageous to place the smaller diameter ring 100 adjacent to a side surface of the epitrochoidal-like shaped race 53 so as to confront the side surface of the support plate 114 as shown in FIG. 1A. Likewise, referring to the opposite side surface of the first and second confronting surface region 72, 53 (the left side surfaces as viewed in FIG. 1), it is readily observable that there is more free space between the first and second gear elements 52, 54 at a position which is located radially outward from the hypotrochoidal-like shaped race 72 than exists at a position which is radially inward from the epitrochoidal-like shaped race 53. Therefore, it is advantageous to place the larger diameter ring 102 adjacent to the side surface of the hypotrochoidal-like shaped surface region 72 so as to confront the second gear element 54, as shown in FIG. 1A. Though the ring arrangement shown in FIG. 1 and 1A is preferable, it should readily be evident that, with minor modifications of the configuration of the elements 114, 70 and 52, it would easily be possible to position a pair of the smaller diameter rings 100 adjacent opposite sides of the epitrochoidal-like shaped surface region 53, as shown in FIG. 4; or alternatively, to position a pair of the larger diameter rings 102 adjacent opposite sides of the hypotrochoidal-like shaped surface region 72, as shown in FIG. 5, rather than utilizing both a smaller and a larger diameter ring 100, 102, respectively.

The embodiment of FIG. 3 is advantageous when the axial width of the hypo- and epitrochoidal-like shaped surface regions are the same, as shown in in FIG. 1, since the structural strength provided by the rings and the pins secured to the lobes thereof minimize axial movement of the confronting surface regions. However, in some transmissions, it is advantageous to form the confronting surface regions so as to have differing widths in which case the "C" or "U" cross-sectional shapes illustrated in FIGS. 4 and 5 are preferable so as to accurately position the rollers relative to one or the other of the confronting surface regions.

Each of the lobes 104 of the rings 100, 102 are shaped so as to not extend radially beyond an outer circumferential surface of the cylindrical roller 80 being retained by the corresponding pins 108 secured within the holes 106 of each of these lobes to positively prevent any of the lobes from contacting driving and driven surface areas of the first and second confronting surface regions 72, 53. Specifically, when the confronting surface region 72, 53 have identical widths, axial play in the transmission could cause one of the races to be axially displaced to a small extent relative to the other race in which case one of the driving or driven surface areas thereof would be opposed to either the smaller diameter ring lobes or the larger diameter ring lobes. In such a situation, if the lobes 104 extended radially outward from an outer cylindrical surface of the roller 80 being retained thereby, contact between the lobe 104 and either the driving or driven surface areas of the surface region 72, 53 would occur which would impair the operation of the transmission. Also, the lobes 104 ar required to be shaped so as not to extend radially beyond the outer circumferential surface of the corresponding cylindrical roller 80 being retained thereby when the "C" or "U" cross-sectional shaped retainer illustrated in FIGS. 4 and 5 is disposed so as to be in close contact with opposite side surfaces of the surface region having the width smaller than the other surface region since the lobes would always be opposed to the driving or driven surface of this other surface region.

As is readily evident, the retainers constructed in accordance with the embodiments of the present invention achieve accurate control of the rollers so that the rollers are maintained appropriately spaced apart. Also, since the side surfaces of the first and second rings confront and contact side surfaces of the first and second surface regions, and opposite end surfaces of the rollers are in close contact with the first and second rings, axial movement of the rollers is prevented or kept to a bare minimum. Since the various components of the retainer of the present invention comprise relatively simple geometric shapes, the retainer of the present invention is also relatively inexpensive to manufacture.

We claim:

1. An epicyclic speed reducing transmission, comprising:
    first gear means (70) having a first surface region (72);
    second gear means (50) having a second surface region (53) which confronts said first surface region;

cam means (10, 30) for orbitably driving one of said gear means and said corresponding confronting surface region;

a set of cylindrical rollers (80) disposed between said first and second confronting surface regions for transmitting torque therebetween;

said first and second confronting surface regions each comprising a series of lobes (126) and recesses (128) shaped and arranged such that a first recess (128′) on said first confronting surface region confronts a second recess (128″) on said second confronting surface region and also such that a first lobe (126′) on said first confronting surface region confronts a second lobe (126″) on said second confronting surface region;

said first and second confronting recesses being on a substantially diametrically opposite side (130, 132) of said first and second confronting surface regions, respectively, than said first and second confronting lobes;

said first and second confronting surface regions being further shaped and arranged such that only one of said cylindrical rollers can be contained between said confronting recesses and only one of said cylindrical rollers can be contained between said confronting lobes;

a retainer (96) for retaining said plurality of cylindrical rollers in spaced relationship between said first and second confronting surface regions, said retainer comprising:

first and second rings (100, 102), said first ring having a series of holes (106) therein which confront corresponding holes in said second ring;

a series of roller pins (108, 112) having opposite ends (108) supported by said first and second rings in said holes;

said cylindrical rollers being rotatably supported by said series of pins so as to confront said first and second confronting surface regions and transmit torque therebetween.

2. The transmission as claimed in claim 1, wherein said first and second rings each have a series of lobes extending radially therefrom, said series of holes in each of said rings being formed in said lobes, said holes being positioned and said lobes being sized such that an outermost circumferential surface of said rollers extend radially outward from an outermost surface of said lobes relative to an axis of said respective roller being retained by said respective pin supported by said respective lobe.

3. The transmission as claimed in claim 2, wherein said lobes are semicircular-shaped.

4. The transmission as claimed in claim 2, wherein an outermost portion of said pin ends are deformed so as to fixedly support said pin ends by said first and second rings.

5. The transmission as claimed in claim 2, wherein an outermost portion of said pin ends are threaded, and further comprising nut and washer means engaged with said threads to fixedly support said pin ends by said first and second rings.

6. The transmission as claimed in claim 2, wherein each of said pins has an enlarged pin body portion (112) located between said respective opposite ends, said rollers having axial holes (110) therein through which said enlarged pin body portions extend to rotatably support said rollers.

7. The transmission as claimed in claim 2, wherein said lobes of said first ring extend radially inward relative to an axis of said first ring, and said lobes of said second ring extend radially outward relative to an axis of said second ring.

8. The transmission as claimed in claim 7, wherein said first ring is in close contact with a side surface of said first confronting surface region, and said second ring is in close contact with a side surface of said second confronting surface region.

9. The transmission as claimed in claim 2, wherein said lobes of said first and second rings extend radially inward relative to an axis of said first and second rings, respectively.

10. The transmission as claimed in claim 2, wherein said lobes of said first and second rings extend radially outward relative to an axis of said first and second rings, respectively.

11. The transmission as claimed in claim 9, wherein said first and second rings are in close contact with opposite side surfaces of only one of said confronting surface regions.

12. The transmission as claimed in claim 10, wherein said first and second rings are in close contact with opposite side surfaces of only one of said confronting surface regions.

* * * * *